(12) United States Patent
Ducharme

(10) Patent No.: US 8,917,868 B2
(45) Date of Patent: Dec. 23, 2014

(54) ADAPTABLE ENCRYPTION DEVICE AND METHODS FOR USE THEREWITH

(75) Inventor: Paul D. Ducharme, Richmond Hill (CA)

(73) Assignee: ViXS Systems, Inc., Toronto, Ontario (CA)

( * ) Notice: Subject to any disclaimer, the term of this patent is extended or adjusted under 35 U.S.C. 154(b) by 167 days.

(21) Appl. No.: 13/591,404

(22) Filed: Aug. 22, 2012

(65) Prior Publication Data
US 2014/0056426 A1  Feb. 27, 2014

(51) Int. Cl.
*H04L 29/06* (2006.01)

(52) U.S. Cl.
USPC .......................................................... 380/210

(58) Field of Classification Search
USPC ................................................ 380/210, 205
See application file for complete search history.

(56) References Cited

U.S. PATENT DOCUMENTS

| | | | |
|---|---|---|---|
| 7,233,669 B2 * | 6/2007 | Candelore | 380/210 |
| 8,542,830 B2 * | 9/2013 | Wasilewski et al. | 380/239 |
| 8,543,804 B2 * | 9/2013 | Moon et al. | 713/150 |
| 2006/0031889 A1 * | 2/2006 | Bennett et al. | 725/80 |
| 2010/0054477 A1 * | 3/2010 | Chew | 380/277 |

* cited by examiner

*Primary Examiner* — Ali Abyaneh
(74) *Attorney, Agent, or Firm* — Garlick & Markison; Bruce E. Stuckman

(57) ABSTRACT

A video processing device includes a data segmentation generator that receives a domain selection, n, and that segments input A/V data into n data blocks. An encryption processing device receives an encryption depth selection, k, and a range selection, m, and sequentially encrypts each of the n data blocks m times using k different keys to generate n encrypted data blocks. An output formatter generates encrypted A/V data from the n encrypted data blocks.

16 Claims, 7 Drawing Sheets

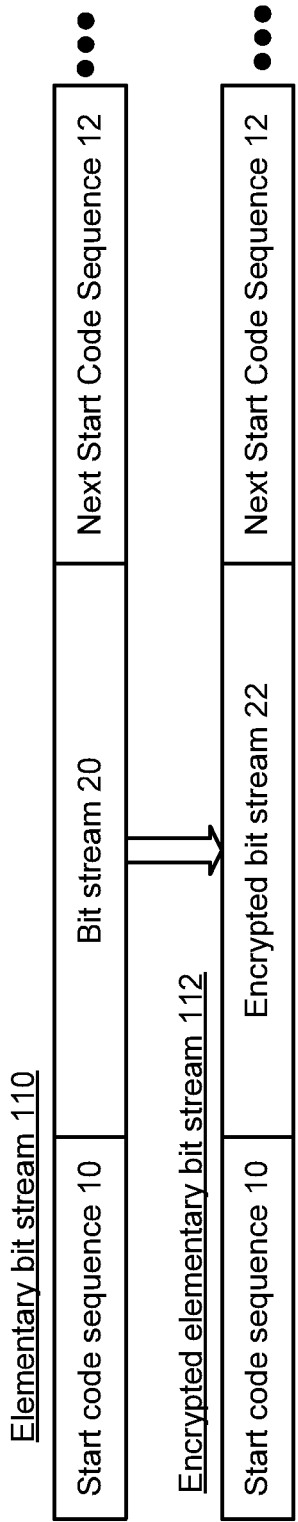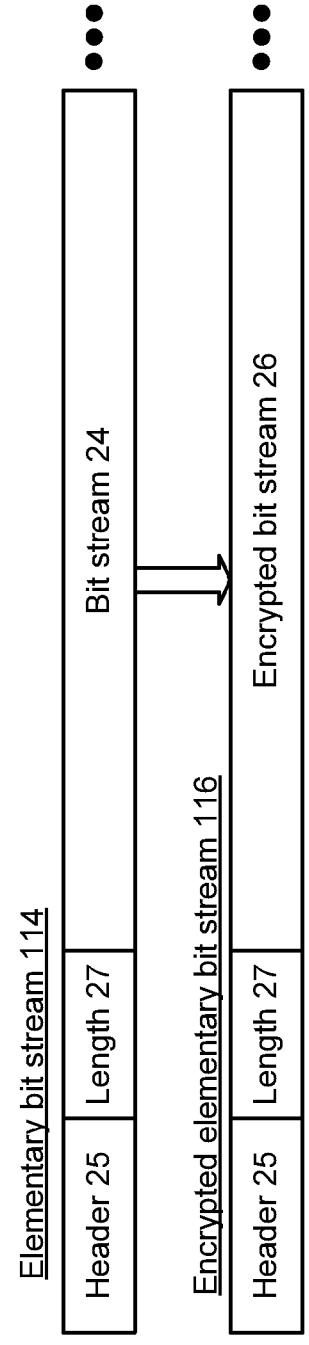
FIG. 5
FIG. 6

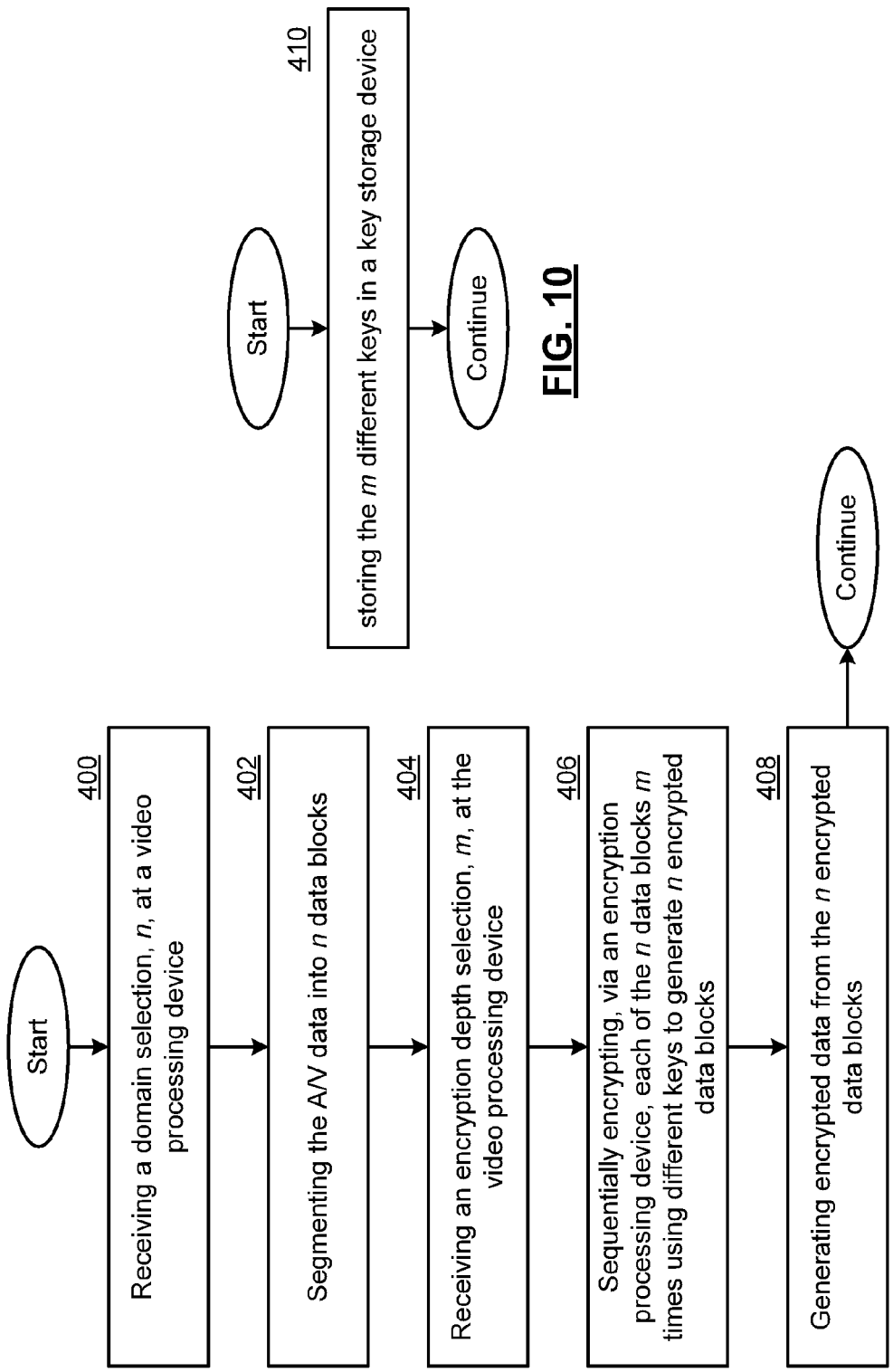

ADAPTABLE ENCRYPTION DEVICE AND METHODS FOR USE THEREWITH

TECHNICAL FIELD OF THE INVENTION

The present invention relates to secure distribution and protection of content such as media content.

DESCRIPTION OF RELATED ART

There are several instances where Audio/Video content is encrypted; this is done for commercial reasons to protect the content from piracy and to enforce ownership rights. Encryption is a common practice in Cable/Satellite/Terrestrial broadcast of Transport Streams (TS), Recordings to Optical media such as CD/DVD/BD Sectors or Packetized Elementary Stream (PES) records, Transmission using Internet Protocol (IP) such as over the Internet or on wired or wireless local Ethernet transmission and recordings to Hard Drives (HD) as in PVR applications. In these implementations it is common to involve a Conditional Access (CA) provider or a Digital Rights Management (DRM) standard which has the responsibility to securely deliver Keys and Control Words to be used to encrypt the Content. Associated with the CA/DRM providers but as a separate aspect there are standards used to encrypt the content itself (using keys delivered by the CA/DRM). These content encryption standards operate on various container types such as TS packets, IP packets, CD/DVD/BD/HD sectors or PES packets. The traditional algorithms used for the encryption of content are DES/3DES in North America, DVB-CSA2 in Europe, Multi-2 in Japan, and CSS for DVD's. More recently content is being encrypted typically using AES-128 such as for BD and IP based protocols and newer TS based protocols.

Due to advancements in computational performance many of the traditional algorithms are becoming vulnerable to brute force attacks and so there is a need to improve the level of security used to encrypt content. For example, the following are the order of operations (i.e. cryptographic strength) associated with traditional algorithms.

| Algorithm | Cryptographic Strength |
|---|---|
| DES | $O(2^{56})$ |
| 3DES | $O(2^{112})$ |
| DVB-CSA2 | $O(2^{48})$ |
| Multi-2 | $O(2^{64})$ |

Some of these algorithms also have inherent weaknesses discovered over the years which make them weaker than the raw brute force order of operation would indicate. Many new standards typically are adopting AES-128 because this algorithm has better resistance to attacks and has a larger key size and therefore greater cryptographic strength (i.e. AES-128=$O(2^{128})$). However even at this level there are proposals to improve the security further. A competing interest is to minimize the complexity and cost of encryption standards as this has a limiting or constraining effect on many devices which adopt new encryption standards.

Some standards are attempting to improve security levels; these generally fall into 2 categories:
  (a) the use of AES-128 in chaining modes (for example DVB-CSA3) for TS streams; and
  (b) the use of larger keys (AES-256, AES-512) for HD's.
These proposals have some drawbacks which have negative implications and unexpected consequences. In particular, a recent proposed algorithm (DVB-CSA3) use AES (with chaining) with the intention of improving security by causing large portions (or the entire) payload to be corrupted if the wrong key is used. In one example, TS packets using AES-128 in a chaining algorithm may be degraded is adaptation field is specified of 184−16=168 bytes (i.e. leaving a payload of 128 bits) which means that any improvement due to chaining can be negated by an attacker and this reduces the cryptographic strength to $O(2^{128})$ regardless of the chaining. Also these algorithms invariably specify an IV=0 which means that although the algorithms is far more complex and computationally expensive they have not effectively increased the cryptographic strength. In addition, Audio/Video (A/V) encoding standards are designed to be error tolerant based on the expectation that transmission and storage technologies will invariably introduce small but non zero bit error rates. This property of A/V encoding error tolerance is referred to as error concealment. One consequence of these AES chaining based algorithms is that a single bit error may be propagated to corrupt the entire payload being encrypted. This has the effect of creating large visual and audio artifacts which normally would have been concealed from the end user; this has a very negative consequence in terms of user experience.

Another approach to improving security is to increase the size of the key used (i.e. use of AES-256 or AES-512). This has the desired effect of improving the security level but it implies that bit errors will propagate to larger portions of the payload and these algorithms are more computationally expensive. Note that the traditional algorithms operated on 64 bit data with no chaining where a bit error would only affect a small portion of the payload (i.e. 8 bytes), even using the AES-128 algorithm has doubled the size of the affected payload in the case of a bit error. Therefore just increasing the size of the key also has a negative effect on the user experience in the case of single bit errors.

The limitations and disadvantages of conventional and traditional approaches will become apparent to one of ordinary skill in the art through comparison of such systems with the present invention.

BRIEF DESCRIPTION OF THE SEVERAL VIEWS OF THE DRAWINGS

FIGS. 5-6 present schematic block diagram representations of elementary and encrypted elementary bit streams in accordance with an embodiment of the present invention.

FIG. 9 presents a flowchart representation of a method in accordance with an embodiment of the present invention.

FIG. 10 presents a flowchart representation of a method in accordance with an embodiment of the present invention.

DETAILED DESCRIPTION OF THE INVENTION INCLUDING THE PRESENTLY PREFERRED EMBODIMENTS

Figure 1:
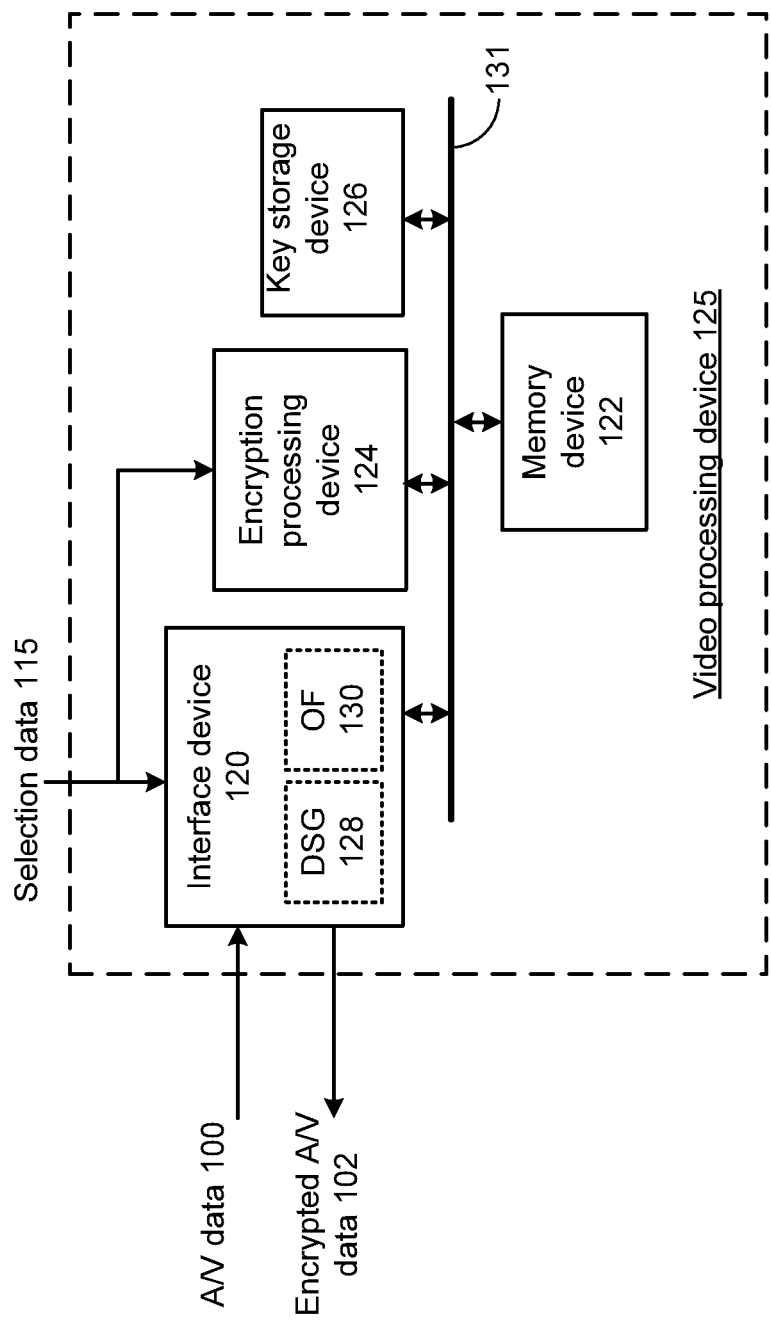
FIG. 1 presents a schematic block diagram representation of a audio/video processing device 125 in accordance with an embodiment of the present invention.

FIG. 1 presents a schematic block diagram representation of a video processing device 125 in accordance with an embodiment of the present invention. In particular, video processing device 125 includes an interface device 120 that receives A/V data 100 such as compressed video streams in an elementary stream format so as to provide an alternative encryption mechanism for the techniques described in conjunction with copending application Ser. No. 13/423,876, entitled, CONTAINER AGNOSTIC ENCRYPTION DEVICE AND METHODS FOR USE THEREWITH. In addition, compressed video streams in a container format or other format can also be encrypted. A key storage device 126 stores one or more encryption keys. In an embodiment of the present invention, key storage device 126 is implemented via a memory device that may be separate from or included within memory device 122. Such a memory device can include a hard disk drive or other disk drive, read-only memory, random access memory, volatile memory, non-volatile memory, static memory, dynamic memory, flash memory, cache memory, and/or any device that stores digital information. In an embodiment of the present invention, the existing conditional access/digital rights management may be used to perform a key exchange and rights management to populate and/or share the keys from key storage device 126.

The interface device 120 includes a data segmentation generator (DSG) 128 that receives selection data 115 that includes a domain selection, n. The data segmentation generator 128 segments the A/V data into n data blocks and optionally an additional remainder. The encryption processing device 124 receives selection data 115 that includes an encryption depth selection, k, and a range selection, m. The encryption processing device 124 retrieves m different keys from the key storage device 126 and sequentially encrypts each of the n data blocks m times using the k different keys to generate n encrypted data blocks. An output formatter (OF) 130 of interface device 120 generates encrypted A/V data 102 from the n encrypted data blocks.

As discussed above, the data segmentation generator 128 optionally segments the A/V data 100 to further include a residual data that is smaller than the size of a standard block or optionally padded to the block size of the data blocks. In an embodiment, the residual data is not encrypted and the output formatter 130 generates the encrypted A/V data from the n encrypted data blocks and the residual data. In an embodiment, the format of encrypted A/V data 102 is the same as A/V data 100, however other format conversions can optionally be performed and A/V encrypted data 102 can be output in a different format.

In an embodiment of the present invention, the encryption processing device 124 and the interface device 120 can be implemented using a single processing device or a plurality of processing devices. Such a processing device may be a microprocessor, co-processors, a micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory, such as memory module 122. Memory module 122 may be a single memory device or a plurality of memory devices. Such a memory device can include a hard disk drive or other disk drive, read-only memory, random access memory, volatile memory, non-volatile memory, static memory, dynamic memory, flash memory, cache memory, and/or any device that stores digital information. Note that when the processing device implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. While a particular bus architecture is shown that employs a single bus 131, alternative architectures using direct connectivity between one or more modules and/or additional buses can likewise be implemented in accordance with the present invention.

The video processing device 125 can be implemented in conjunction with a video encoder, transcoder or decoder. In this fashion, the video processing device 125 can embed the encryption operations within an encoder, transcoder or decoder. Further details, including optional implementations and additional functions and features are described in conjunction with FIGS. 2-10 that follow.

Figure 2:
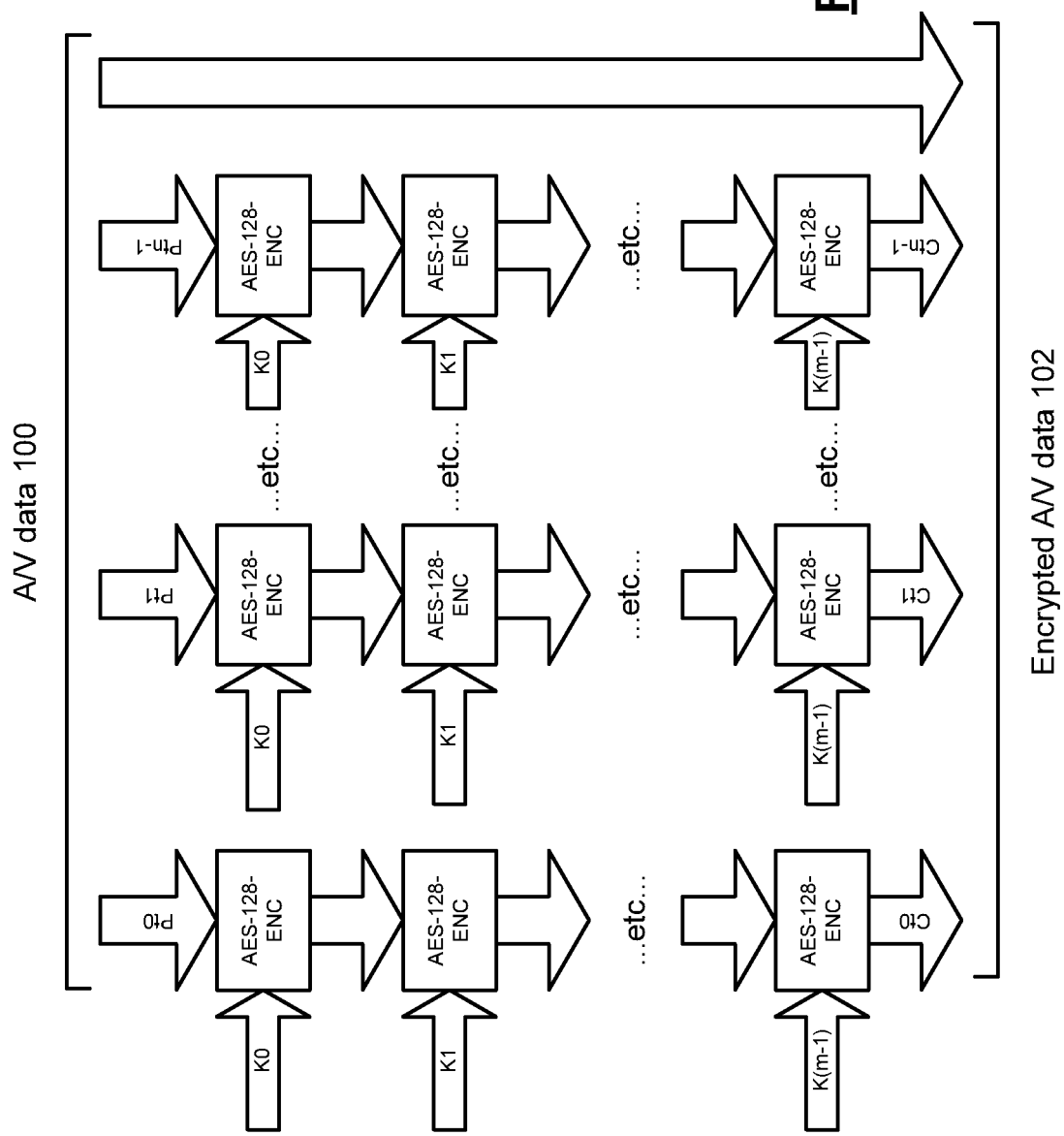
FIG. 2 presents a schematic flow diagram representation of an encryption in accordance with an embodiment of the present invention.

FIG. 2 presents a schematic flow diagram representation of an encryption in accordance with an embodiment of the present invention. In particular, an example of an adaptive A/V encryption (AAVE) performed by encryption processing device 125 is presented. In this example, AAVE employs m sequential AES-128 encryptions to the A/V data 100 that has been segmented into n 128-bit plain text blocks (Pt0, . . . , Ptn−1) to generate n 128-bit cipher text blocks (Ct0, . . . , Ctn−1) using keys (K0, . . . Km−1). The plain text and cipher text consists of L bits of data where $n \times 16 \leq L$ (i.e. the n 128-bit blocks of plain text are less than or equal to L with the remaining bits assigned to the residual). For small values of n the residual may be larger than one or more 128-bit blocks. The encrypted A/V data 102 includes the n 128-bit cipher text blocks and the residual that is copied from input to output without encryption.

It should be noted that while AES-128 is used as the basic encryption algorithm, AES encryption of other lengths could be used with a corresponding change in block size. Further, other encryption algorithms could optionally be substituted in place of AES-128, with segmentation to the corresponding block size.

Figure 3:
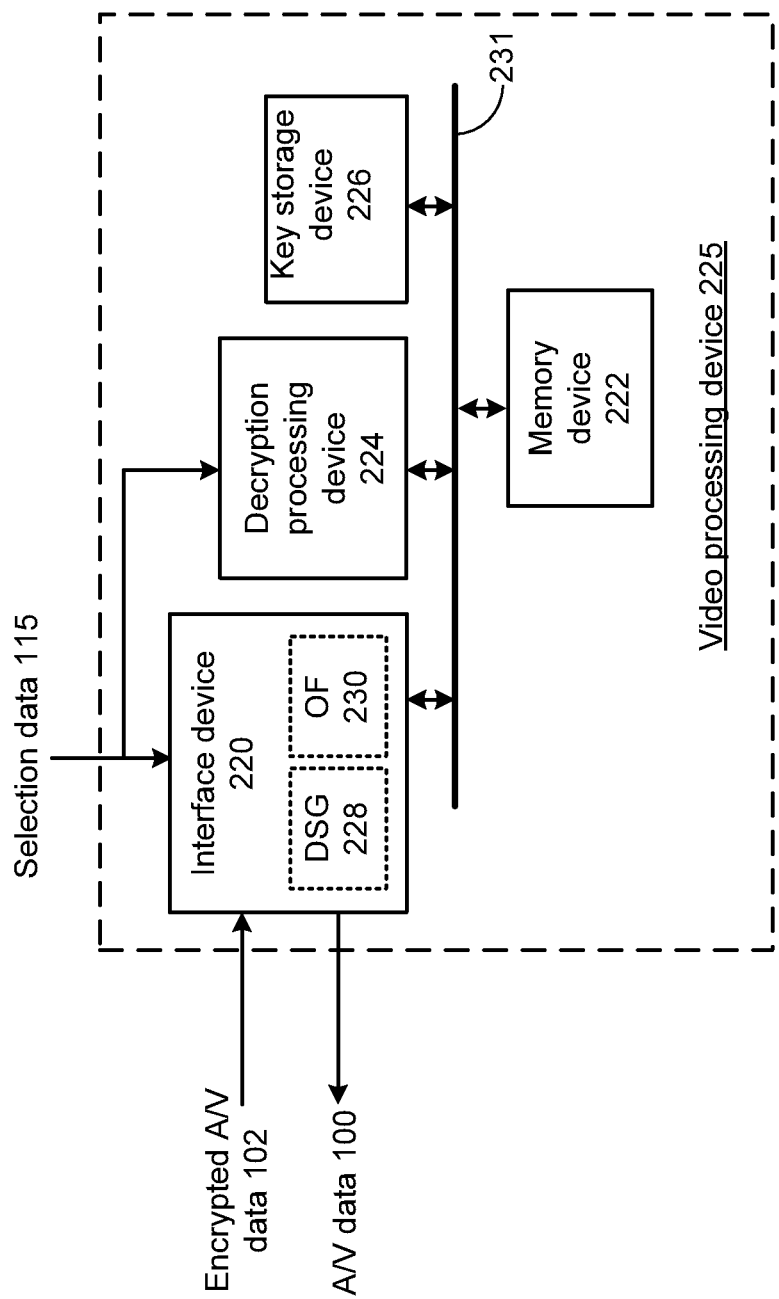
FIG. 3 presents a schematic block diagram representation of an elementary and encrypted elementary bit streams in accordance with an embodiment of the present invention.

FIG. 3 presents a schematic block diagram representation of a video processing device 225 in accordance with an embodiment of the present invention. In particular, video processing device 225 includes an interface device 220 that receives encrypted A/V data 100 such as compressed or uncompressed video streams in an elementary stream format, container format or other format. A key storage device 226 stores one or more encryption keys. In an embodiment of the present invention, key storage device 226 is implemented via a memory device that may be separate from or included within memory device 222. Such a memory device can include a hard disk drive or other disk drive, read-only memory, random access memory, volatile memory, non-volatile memory, static memory, dynamic memory, flash memory, cache memory, and/or any device that stores digital information. In an embodiment of the present invention, the existing conditional access/digital rights management may be used to perform a key exchange and rights management to populate and/or share the keys from key storage device 226.

The interface device 220 includes a data segmentation generator (DSG) 228 that receives selection data 115 that includes a domain selection, n. The data segmentation generator 228 segments the encrypted A/V data 102 into n data blocks and optionally an additional remainder/residual. The decryption processing device 224 receives selection data 115 that includes an encryption depth selection, k, and a range selection, m. The decryption processing device 224 retrieves m different keys from the key storage device 226 and sequentially decrypts each of the n data blocks m times using the k different keys to generate n decrypted data blocks. An output formatter (OF) 230 of interface device 220 generates A/V data 100 from the n decrypted data blocks.

As discussed above, the data segmentation generator 228 optionally segments the encrypted A/V data 102 to further include a residual data that is smaller than the size of a standard block or optionally padded to the block size of the data blocks. In an embodiment, the residual data is not encrypted and the output formatter 230 generates the A/V data 100 from the n decrypted data blocks and the residual data. In an embodiment, the format of encrypted A/V data 102 is the same as A/V data 100, however other format conversions can optionally be performed and A/V data 100 can be output in a different format.

In an embodiment of the present invention, the decryption processing device 224 and the interface device 220 can be implemented using a single processing device or a plurality of processing devices. Such a processing device may be a microprocessor, co-processors, a micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory, such as memory module 222. Memory module 222 may be a single memory device or a plurality of memory devices. Such a memory device can include a hard disk drive or other disk drive, read-only memory, random access memory, volatile memory, non-volatile memory, static memory, dynamic memory, flash memory, cache memory, and/or any device that stores digital information. Note that when the processing device implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. While a particular bus architecture is shown that employs a single bus 231, alternative architectures using direct connectivity between one or more modules and/or additional buses can likewise be implemented in accordance with the present invention.

The video processing device 225 can be implemented in conjunction with a video encoder, transcoder or decoder. In this fashion, the video processing device 225 can embed the encryption operations within an encoder, transcoder or decoder.

Figure 4:
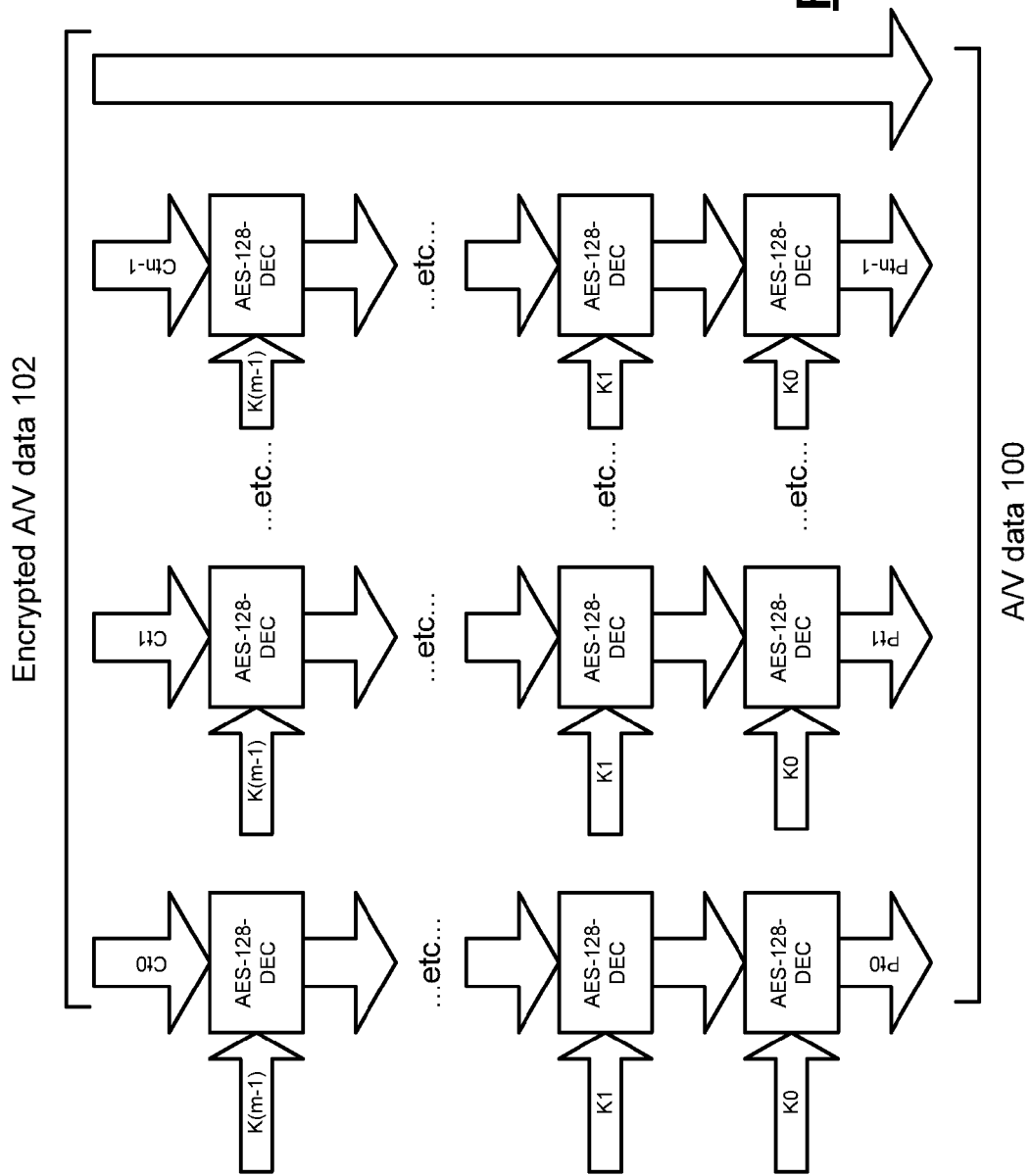
FIG. 4 presents a schematic block diagram representation of an elementary and encrypted elementary bit streams in accordance with an embodiment of the present invention.

FIG. 4 presents a schematic flow diagram representation of a decryption in accordance with an embodiment of the present invention. In particular, an example of an adaptive A/V decryption (AAVD) performed by decryption processing device 225 is presented that operates as an inverse to AAVE. In this example, AAVD employs m sequential AES-128 encryptions to the encrypted A/V data 102 that has been segmented into n 128-bit cipher text blocks (Ct0, ..., Ctn−1) to generate n 128-bit plain text blocks (Pt0, ..., Ptn−1) using keys (K0, ... Km−1). The plain text and cipher text consists of L bits of data where n×16≤L (i.e. the n 128 bit blocks of plain text are less than or equal to L with the remaining bits assigned to the residual). The encrypted A/V data 102 includes the n 128-bit cipher text blocks and the residual that is copied from input to output without encryption.

The AAVE and AAVD algorithms described in conjunction with FIGS. 1-4 are adaptive in the following sense; the value of n may be variable and is less than or equal to the total payload sizes L/128 bits i.e. n×128 must be less than the payload size L bits as in the case where we choose not to encrypt the entire Audio/Video payload. The n value is referred to as the "domain" of the encryption, i.e. the number of 128 bit data to be encrypted. In addition, different values of keys may be used (K0, ..., Km−1) at different stages, however the total number of different keys used is k (i.e. K1, ..., Kk) where k<=m are the number of keys used. The k value is referred to as the "depth" of encryption.

The value of m may be variable and must be greater than or equal to 1. The value of m is set to a large value for cases where the strength of the encryption is to be increased. In some cases the value of m may be contingent on other criteria—such as the application to the encryption of elementary bit streams described in conjunction with copending application Ser. No. 13/423,876, entitled, CONTAINER AGNOSTIC ENCRYPTION DEVICE AND METHODS FOR USE THEREWITH where m is bounded to be 16 or less and by the presence of a start code sequence. The m value is referred to as the "range" of encryption.

The equation defining the strength of the AAVE encryption is:

$$\text{Cryptographic strength} = O(2^{128k+(m-1)})$$

The equation defining the cost of the AAVE encryption is:

$$\text{Cryptographic Cost} = O(mn)$$

Keys may be applied at different rows in the algorithm to provide a mapping of the keys to the domain. There are several possible mappings which lead to different cryptographic strength and computational costs.

- An unencrypted example would have (n=0, k=0, m=0) i.e. no data is encrypted at no cost.
- The weakest example would use the single key value (i.e. k=1) operating on 128 bits (i.e. Domain=n=1) being encrypted once (i.e. Range=m=1), thus the cryptographic strength would be $O(2^{128})$ with a computational cost of 1 AES operation per L bits.
- The slightly stronger example may extended to a larger domain (i.e. for example n=10 assuming L>10×128 bits), with one key (i.e. k=1) and a single encryption (i.e. Domain=m=1) then the cryptographic strength still $O(2^{128})$ with a computational cost of 10 AES operation per L bits.
- A stronger example may have the same domain (i.e. n=10) use one key (i.e. k=1) and two encryption per 128 bits (i.e. domain=m=2), thus the cryptographic strength is (i.e. $O(2^{128k+(m-1)})=O(2^{129})$) and the computational cost of 20 AES operation per L bits.
- An even stronger example may have the same range (i.e. n=10) use the two key values (i.e. k=2) with the same domain (i.e. m=2), thus the cryptographic strength is (i.e. $O(2^{128k+(m-1)})=O(2^{257})$) and the computational cost would still be 20 AES operation per L bits.
- In the strongest example there may have a largest range possible (i.e. n=L mod 128) use the maximum number of key values (i.e. k=m) with a large domain (i.e. for example m=8), thus the cryptographic strength would be (i.e. $O(2^{128k+(m-1)})=O(2^{1031})$) and the computational cost of nm=n×8 AES operation per L bits.

In the examples above it is assumed that the plain text consists of L bits of data (i.e. data length L is greater than the n 128 bit blocks) to be encrypted. Any residual (any portion of the payload greater than n mod 128 bits at the end of the payload) is left un-encrypted.

For a given data of length (L) the encrypted with selection data 115 (n, m, k) provides a method for adjustable encryption which allow Audio/Video content to be encrypted and then decrypted in an adaptable way, i.e. the selection data 115 may be adjusted to fit the various cryptographic circumstances and content encrypted with a particular set of parameters (n, m, k) may be transcrypted to a content with a different set of parameters (n, m, k). The total cryptographic strength of the AAVE algorithm may be equated to the (m, k) and the cryptographic cost is the area (m, n).

The AAVE operations may be expressed as a function of the parameters the data (Data[ ]) and the keys (Keys[ ]) as follows:

$$AAVE(n, m, k, L, Data[\ ], Keys[\ ])$$

The algorithm operates to encrypt the Data[ ] using k Keys[ ] such that n 128 blocks are encrypted m times. For example, the operation, $$AAVE(n=3, m=2, k=1, L, Data[\ ], Keys[\ ]),$$

implies that plain text (Data[ ]) comprises L bits, of which 3×128 bits (i.e. n=3) is encrypted 2 times (i.e. m=2) using the same (i.e. k=1) key (i.e. Keys[ ]).

In a similar way the AAVD operations may be expressed as:

$$AAVD(n, m, k, L, Data[\ ], Keys[\ ])$$

Increasing the domain of the AAVE/AAVD algorithm will result in performing more AES-128 encryptions/decryption operations on the data (i.e. encrypting more or less of the data). This will increase the amount of data which is secured linearly but in some cases (such as for A/V content) it may be unnecessary and preferable to minimize the domain to decrease the computational expense. Increasing the range of the AAVE/AAVD algorithm will result in performing more AES-128 encryptions/decryption operations per 128 bit block of data. This has the effect of linearly improving the security because it raises the strength from $O(2^{128})$ to $O(2^{129})$ to ... $O(2^{128k+(m-1)})$ at the expense of linearly increasing the computational expense. Increasing the depth (i.e. the number of keys) in conjunction with increasing the domain will result in performing AES-128 encryptions/decryption operations with different keys thus increasing the strength of the algorithm exponentially with no direct impact on computational cost.

One aspect of the AAVE/AAVD algorithm is that it can be backwards compatible with existing CA/DRM standards—in that CA/DRM standards may still be used to generate the keys and CW's which are used however the underlying content encryption scheme used would be the AAVE/AAVD algorithm. One way to extend existing CA/DRM systems that deliver a single key would be to derive keys from the single delivered key. For example if a CA/DRM delivers a key X then keys {K0, . . . , Kk−1} may be derived using a series of hash functions such as Kk−1=X, Kk−2=hash(Kk−1), . . . , K0=hash(K2). In this way the single delivered key X may be expanded to generate as many keys as desired.

The AAVE/AAVD algorithm is more error tolerant because a single bit error in any 128 bits of cipher text would only affect 128 bits of plaintext and would not propagate as in the case of the chaining based algorithms and would not affect large blocks of data as in algorithms based on AES-256 and AES-512. In addition, the AAVE/AAVD algorithm is scalable and so it may be adjusted to match or exceed the cryptographic strength of other algorithms. On the other hand, by reducing the domain and range, the AAVE/AAVD algorithm may be adjusted to be less computationally expensive than other algorithms while maintaining the same cryptographic strength. Also the AAVE/AAVD algorithm using AES-128 is less computationally expensive that AES-256 and AES-512 algorithms.

It is possible to use the AAVE/AAVD algorithm to transcript from one encryption technique to another. Examples of such transcription include:

AACS to AAVE/AAVD
AAVE/AAVD to AACS
DTCP to AAVE/AAVD
AAVE/AAVD to DTCP
CSA3 to AAVE/AAVD
AAVE/AAVD to CSA3
DES/3DES to AAVE/AAVD
AAVE/AAVD to DES/3DES
Multi-2 to AAVE/AAVD
AAVE/AAVD to Multi-2
CSA2 to AAVE/AAVD
AAVE/AAVD to CSA2
AAVE/AAVD to AAVE/AAVD One application of AAVE/AAVD→AAVE/AAVD transcryption would be, for example, downgrading AAVE Content. In this application, AAVE encrypted content may be partially decrypted so that a client device with less computational capacity would be able to decrypt the content. This would involve a partial AAVD operation where the Domain or Range would be reduced:

$$AAVD(n0, m0, k, L, Data[\ ], Keys[\ ]) \Rightarrow AAVD(n1, m1, k, L, Data[\ ], Keys[\ ])$$

where n1<n0 and/or m1<m0. In this case, one or more rows or columns of Data[ ] in FIG. 4 are decrypted and the content is sent to the client device less encrypted than the original. In one example, the last j stages of AAVE encryption could be decrypted, leaving m-j stages of encryption for each of the n blocks. Similarly, AAVE content can be upgraded with additional encryption. In this case AAVE encrypted content may be further encrypted so that content may be better protected. An example if this is content which has to be stored statically (i.e. for example on a HD) or content that has to be transmitted across a hostile environment (i.e. for example the Internet). This would involve additional AAVE operation where the domain and/or range and/or depth would be increased:

$$AAVE(n0, m0, k0, L, Data[\ ], Keys[\ ]) \Rightarrow AAVE(n1, m1, k1, L, Data[\ ], Keys[\ ])$$

Where n1>n0 and/or m1>m0 and/or k1>k0 i.e. additional rows or columns of Data[ ] in FIG. 2 have encryption perhaps using additional keys. In one example, j additional stages of AAVE encryption could be added, yielding m0+j stages of encryption for each of the n blocks. Note that upgrading may be particularly applicable to cases where the upgrade is done in association with separate CA/DRM vendors or with keys generated locally by devices or by separate CA/DRM standards. In a further example, the video processing device 125 can operate on A/V data 100 that is encrypted with depth k0 and range m0 to generate encrypted A/V data 102 that is upgraded with depth (k0+k) and range (m0+m).

Further AAVE/AAVD can be employed in multiple stages. In this case AAVE encrypted content may be downgrading AAVE Content or upgrading AAVE Content at multiple stages of transmission or storage of content. This process is useful for managing the security of content which may have varying security requirements at various stages in its life cycle or as it is transmitted across multiple media.

As previously noted, the A/V data 100 and/or encrypted A/V data 102 can be the payload portion of an A/V container format. As further noted, A/V data 100 can may be encrypted at the elementary stream level. AAVE is particularly applicable at this level as it provides flexibility which compliments container agnostic encryption. In this mode of operation, video processing device 125 directly encrypts the elementary bit streams into encrypted elementary bit streams. In pertinent part, portions of the audio and video elementary bit streams are encrypted and other portions, such as header and control data are left unencrypted to facilitate the processing of the encrypted elementary bit streams, while still encrypted. For example, the video processing device 125 can encrypt the elementary streams without encrypting framing data associated with the compressed video signal. This allows some operations, such as disc seek operations, trick mode play features, PVR functions, etc., to be performed without decrypting the stream.

The encrypted elementary stream is a container-agnostic encryption format that allows the audio and video content to be carried in any container (IP/TS/PES) without having to perform encryption at the container level. In this fashion, the video processing device 125 encrypts elementary streams without encrypting formatting data associated with container formats that may be employed to carry the compressed audio/video signal.

FIG. 5 presents a schematic block diagram representation of an elementary and encrypted elementary bit streams in accordance with an embodiment of the present invention. In this embodiment, instead of encrypting video data at the container level, the encryption operation operates at the ES level.

In particular, an elementary bit stream 110 is shown that carries a compressed video bit stream in the payload 20. As shown, portions of the video bit stream 20 are separated by an initial start code sequence 10 such as (0x00, 0x00, 0x01, 0xTT) or other start code sequence and the next start code sequence 12. The encrypted elementary bit stream 112 is formed from the same start code sequences 10 and 12, but by encrypting the bit stream 20 into encrypted bit stream 22 via AAVE.

The video bit stream 20 includes encoded information pertaining to the Macro Blocks, Motion Vectors, Quantization Matrices, etc., of the frames and fields of the video signal. This portion is encrypted to protect the content of the video signal, but leaves framing information un-encrypted. In this fashion, the framing information for all layers of video distribution (i.e. all IP, TS, PES containers) would be left un-encrypted and only portions of the lowest level Elementary Stream (ES) would be encrypted. In this scenario the encrypted video content would be un-usable but all the structural information involving framing and timing would be available so that the stream may be manipulated while in the encrypted state.

There are several options as to which level or which portion of the ES bit stream to encrypt. It may be sufficient to only encrypt ES video sequences within I-frames as these are critical for decoding of P and B frames and if the I-frame is corrupted then the rest of the video frame will not decode properly. This would reduce the performance requirements because fewer bit sequences would have to be encrypted but it would require parsing of the video to detect I-frames. Another logical point to apply ES encryption for video would be at the slice level only as this is a conveniently identifiable sequence within the bit stream.

FIG. 6 presents a schematic block diagram representation of an elementary and encrypted elementary bit streams in accordance with an embodiment of the present invention. In particular, an elementary bit stream 114 is shown that carries a compressed audio bit stream representing compressed PCM samples in the payload 24. As shown, portions of the audio bit stream 24 are separated by start fields such as header 25 and length 27. The encrypted elementary bit stream 116 is formed from the same start fields but by encrypting the bit stream 24 into encrypted bit stream 26 via AAVE.

For audio, the encryption functions operate on the compressed audio PCM samples but leave all framing information un-encrypted. In this way the framing information for all layers of audio distribution (i.e. all IP, TS, PES containers) would be left un-encrypted and only portions of the lowest level Elementary Stream (ES) would be encrypted. In this scenario the encrypted Audio content would be un-usable but all the structural information involving framing and timing would be available so that the stream may be manipulated while in the encrypted state. Decryption of the AAVE streams of FIGS. 5-6 employ AAVD in a similar fashion.

Figure 7:
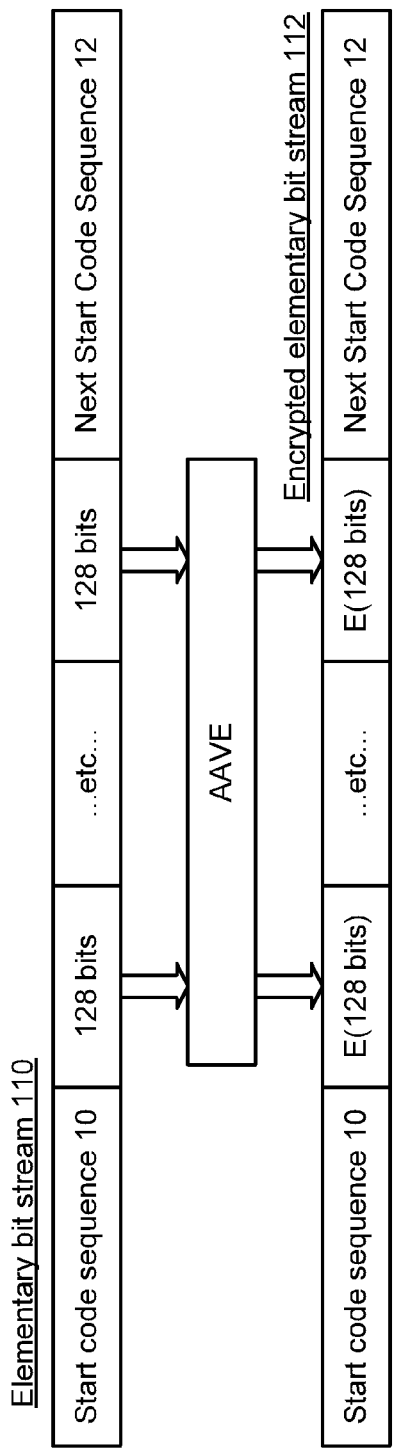
FIG. 7 presents a schematic block diagram representation of a video processing device 225 in accordance with an embodiment of the present invention.
Figure 8:
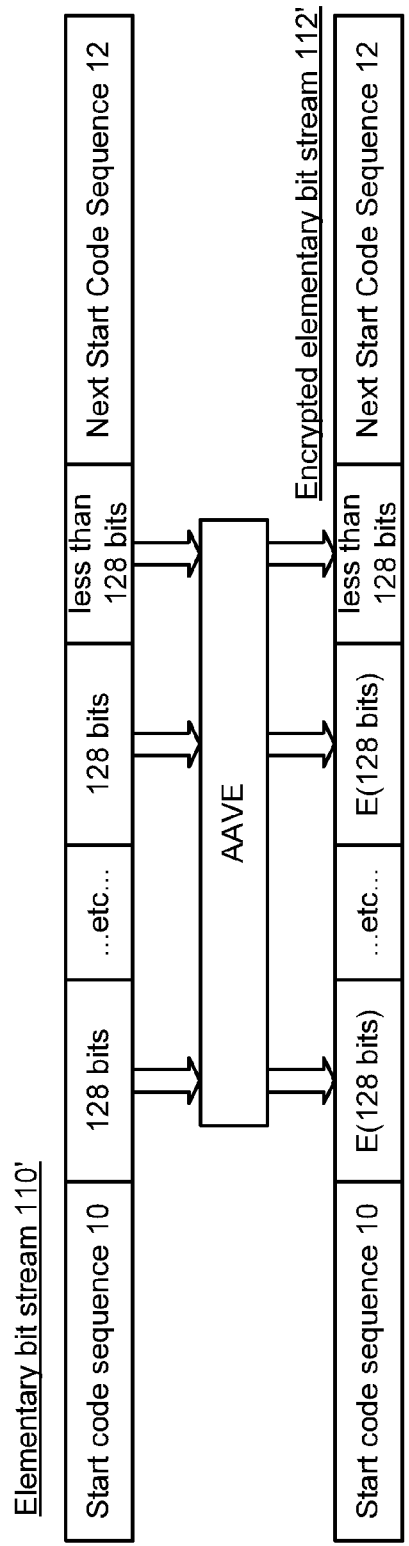
FIG. 8 presents a schematic flow diagram representation of a decryption in accordance with an embodiment of the present invention.

FIGS. 7-8 present a schematic block diagram representations of elementary and encrypted elementary bit streams in accordance with an embodiment of the present invention. In particular, these examples are presented in conjunction with a video elementary bit stream such as elementary bit stream 110. Such a video ES can present a challenge because the payload portion 20 can consist of a series of bits of undeterminant length, bracketed only by start code sequences such as (0x00,0x00,0x01,0xTT) where: 0xTT is an 8 bit start code value; the start code sequences must always occur on 8 bit boundaries—which implies that bit sequences+padding also occupy integral 8 bit boundaries; the 0x00,0x00,0x01,0xTT sequence may never appear within the bit sequence.

This group of bits between sucessive start code sequences is segmented by bit data segmentation generator 128 into blocks. In the example presented in conjunction with FIG. 7, the group of bits is 128 bit aligned can be segmented into a plurality of blocks that are each 128 bits long. The video processing device 125 operates on each of the resulting blocks via the AAVE encryption algorithm.

In the case presented in conjunction with FIG. 8, the group of bits between sucessive start code sequences is not 128 bit aligned but is longer than 128 bits. The data segmentation generator 128 generates a plurality of blocks that includes one or more standard blocks of standard length and a remainder block that is less than the standard length. In particular, the blocks include several blocks of length 128 and a remainder block that is less than 128 bits long that AAVE optionally leaves unencrypted.

In each of the examples presented above, the group of bits are encrypted without altering the start code sequence(s) which are left un-encrypted, but also encrypted in order to enforce the constraint that a start code sequence may not occur within the encrypted bit stream. This avoids inserting a false start code sequences that would be detected as a coding error when the elementary stream is processed, such as during decryption.

It should be noted that the above examples present one possible segmentation procedure for the group of bits between sucessive start code sequences. Other segmentations including the use of other block sizes could be employed. In addition, additional bit padding can be employed in bit data segmentation generator 128 to force uniform block sizes in other implementations.

FIG. 9 presents a flowchart representation of a method in accordance with an embodiment of the present invention. In particular a method is presented that includes one or more function and features described in conjunction with FIGS.

1-8. In step 400, a domain selection, n, is received at a video processing device. In step 402, the A/V data is segmented into n data blocks. In step 404, an encryption depth selection, k, and a range selection, m, are received at the video processing device. In step 406, the method sequentially encrypts, via an encryption processing device, each of the n data blocks m times using k different keys to generate n encrypted data blocks. In step 408, encrypted A/V data are generated from the n encrypted data blocks.

In an embodiment, step 402 further includes generating a residual data, and step 408 further includes generated the encrypted A/V data from the residual data. In particular, the residual data may or may not be encrypted when included in the encrypted A/V data. The A/V data can be encrypted with depth k0 and range m0 and the encrypted A/V data can be upgraded with depth (k0+k) and range (m0+m). More generally, the A/V data can be encrypted with domain n0, depth k0 and range m0 and the encrypted A/V data is adjusted in accordance with the domain selection n, depth selection k and range selection m to a different domain, depth and/or range. The A/V data can be the payload portion of an A/V container format. The A/V data can be formatted in accordance with an A/V format and the encrypted A/V data is formatted in accordance with the same A/V format.

FIG. 10 presents a flowchart representation of a method in accordance with an embodiment of the present invention. In particular a method is presented that includes one or more function and features described in conjunction with FIGS. 1-8. In step 410, the m different keys are stored in a key storage device.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A video processing device for encrypting audio/video (A/V) data, the video processing device comprising:
   a data segmentation generator receives a domain selection n, and segments the A/V data into n data blocks;
   an encryption processing device, coupled to the data segmentation generator, receives an encryption depth selection k, and a range selection m, and sequentially encrypts each of the n data blocks m times using k different keys to generate n encrypted data blocks, wherein the encryption processing device adjusts a strength of encrypted A/V data by changing at least one of: a domain n0, a depth k0 or a range m0 of the A/V data to at least one of: an adjusted domain (n0+n), an adjusted depth (k0+k) or an adjusted range (m0+m);
   an output formatter, coupled to the encryption processing device, generates the encrypted A/V data from the n encrypted data blocks.

2. The video processing device of claim 1 wherein the data segmentation generator segments the A/V data to further include a residual data, and the output formatter generates the encrypted A/V data from the n encrypted data blocks and the residual data.

3. The video processing device of claim 1 wherein the encryption processing device does not encrypt the residual data.

4. The video processing device of claim 1 further comprising:
   a key storage device, coupled to the encryption device, for storing the k different keys.

5. The video processing device of claim 1 wherein the A/V data is a payload portion of an elementary A/V bit stream.

6. The video processing device of claim 1 wherein the encrypted A/V data is upgraded with adjusted depth (k0+k) and adjusted range (m0+m).

7. The video processing device of claim 1 wherein the A/V data is formatted in accordance with an A/V format and the output formatter formats the encrypted A/V data in accordance with the A/V format.

8. A method for encrypting audio/video (A/V) data, the method comprising:
   receiving a domain selection n, at a video processing device;
   segmenting the A/V data into n data blocks;
   receiving an encryption depth selection k, and a range selection m, at the video processing device;
   sequentially encrypting, via an encryption processing device, each of the n data blocks m times using k different keys to generate n encrypted data blocks, adjusting a strength of encrypted A/V data by changing at least one of: a domain n0, a depth k0 or a range m0 of the A/V data to at least one of: an adjusted domain (n0+n), an adjusted depth (k0+k) or an adjusted range (m0+m); and
   generating the encrypted A/V data from the n encrypted data blocks.

9. The method of claim 8 wherein segmenting the A/V data further includes generating a residual data, and the generating the encrypted A/V data from the n encrypted data blocks further includes the residual data.

10. The method of claim 9 wherein the residual data is not encrypted when included in the encrypted A/V data.

11. The method of claim 8 further comprising:
    storing the k different keys in a key storage device.

12. The method of claim 8 wherein the encrypted A/V data is adjusted in accordance with the domain selection n, depth selection k and range selection m.

13. The method of claim 12 wherein at least one of the following conditions are met: $n0 \neq n$, $k0 \neq k$, and $m0 \neq m$.

14. The method of claim 8 wherein the A/V data is a payload portion of an A/V container format.

15. The method of claim 8 wherein the A/V data is formatted in accordance with an A/V format and the encrypted A/V data is formatted in accordance with the A/V format.

16. A video processing device for decrypting audio/video (A/V) data, the video processing device comprising:
    a data segmentation generator receives a domain selection n, and segments the A/V data into n data blocks;
    an decryption processing device, coupled to the data segmentation generator, receives an depth selection k, and a range selection m, and sequentially decrypts each of the n data blocks m times using k different keys to generate n decrypted data blocks, adjusting a strength of decrypted A/V data by changing at least one of: a domain n0, a depth k0 or a range m0 of the A/V data to at least one of: an adjusted domain (n0−n), an adjusted depth (k0−k) or an adjusted range (m0−m);
    an output formatter, coupled to the encryption processing device, generates the decrypted A/V data from the n decrypted data blocks.

* * * * *